United States Patent [19]

Chown

[11] Patent Number: 4,593,840
[45] Date of Patent: Jun. 10, 1986

[54] LOAD CARRYING UNIT

[76] Inventor: Peter A. C. Chown, Foldgate Lane, Wiggenhall St Mary Magdalen, Kings Lynn, Norfolk, England

[21] Appl. No.: 612,379

[22] Filed: May 21, 1984

[30] Foreign Application Priority Data

| May 24, 1983 | [GB] | United Kingdom | 8314344 |
| Jul. 2, 1983 | [GB] | United Kingdom | 8318032 |
| Sep. 22, 1983 | [GB] | United Kingdom | 8325388 |
| Dec. 20, 1983 | [GB] | United Kingdom | 8333920 |

[51] Int. Cl.⁴ .............................................. B60R 9/00
[52] U.S. Cl. .......................... 224/42.03 A; 224/42.44; 280/769; 280/763.1; 280/477; 280/43
[58] Field of Search ............... 224/42.03 R, 42.03 A, 224/273, 42.07, 42.43, 42.44; 280/769, 763.1, 477, 43.1, 43, 62, 64, 511

[56] References Cited

U.S. PATENT DOCUMENTS

| 832,628 | 10/1906 | Schreffler | 280/43.1 |
| 2,924,463 | 2/1960 | Livermont | 280/763.1 |
| 4,412,635 | 11/1983 | Bateman | 224/42.03 R |

FOREIGN PATENT DOCUMENTS 1027527 3/1978 Canada ..................... 224/42.03 B Primary Examiner—Stephen Marcus
Assistant Examiner—David Voorhees
Attorney, Agent, or Firm—Neal J. Mosely

[57] ABSTRACT

A load carrying unit includes a load carrying portion having a pair of wheels lockably raisable and lowerable in relation thereto. The load carrying portion may be connected to a vehicle by means of a standard ball-and-socket hitch used in conjunction with a cantilever arm. Once the hitch and arm have been connected to the vehicle, the wheels may be raised and the load carrying portion slid toward the vehicle to reduce the cantilever stress on the arm. The load carrying portion and the vehicle may be driven as though there were no trailer.

8 Claims, 9 Drawing Figures

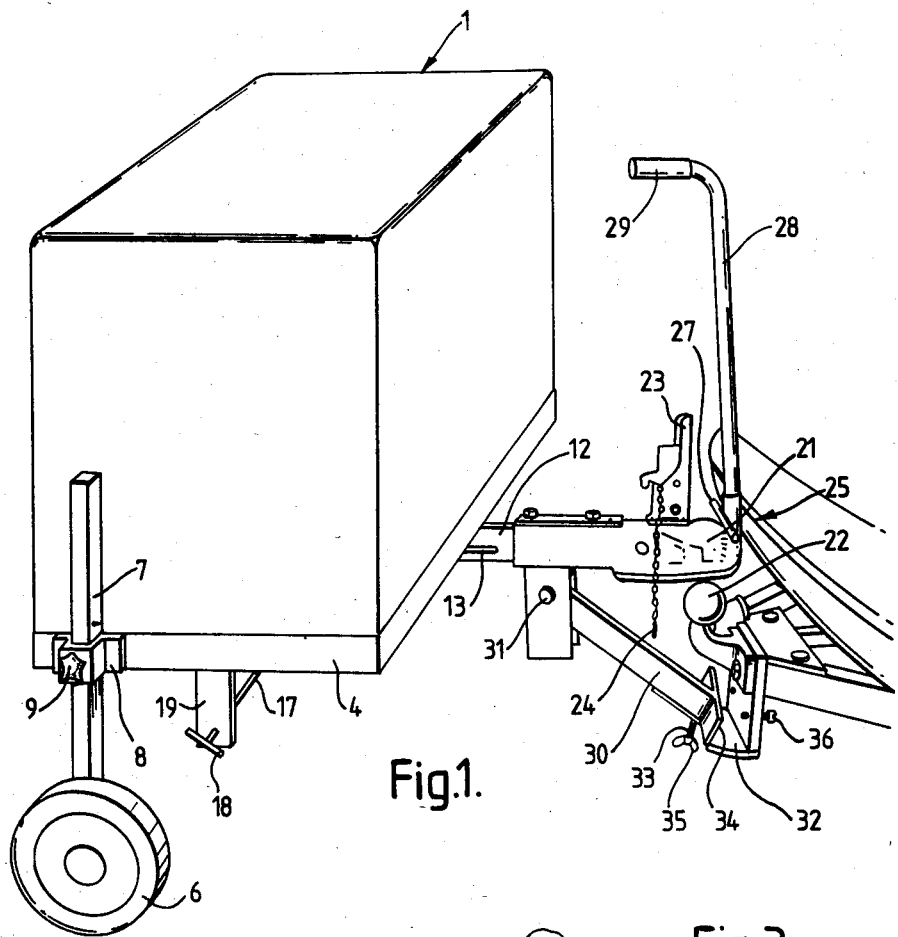
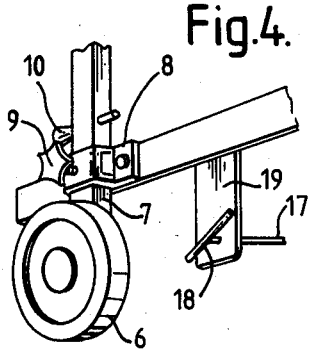
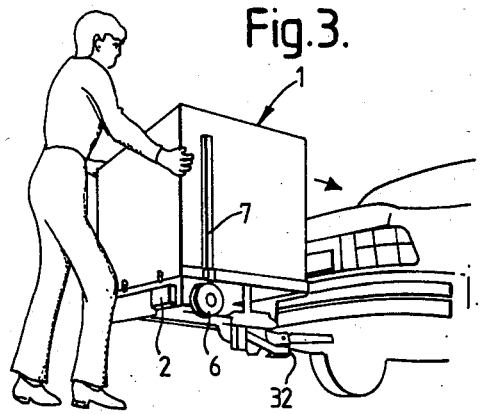
Fig. 1.
Fig. 4.
Fig. 3.

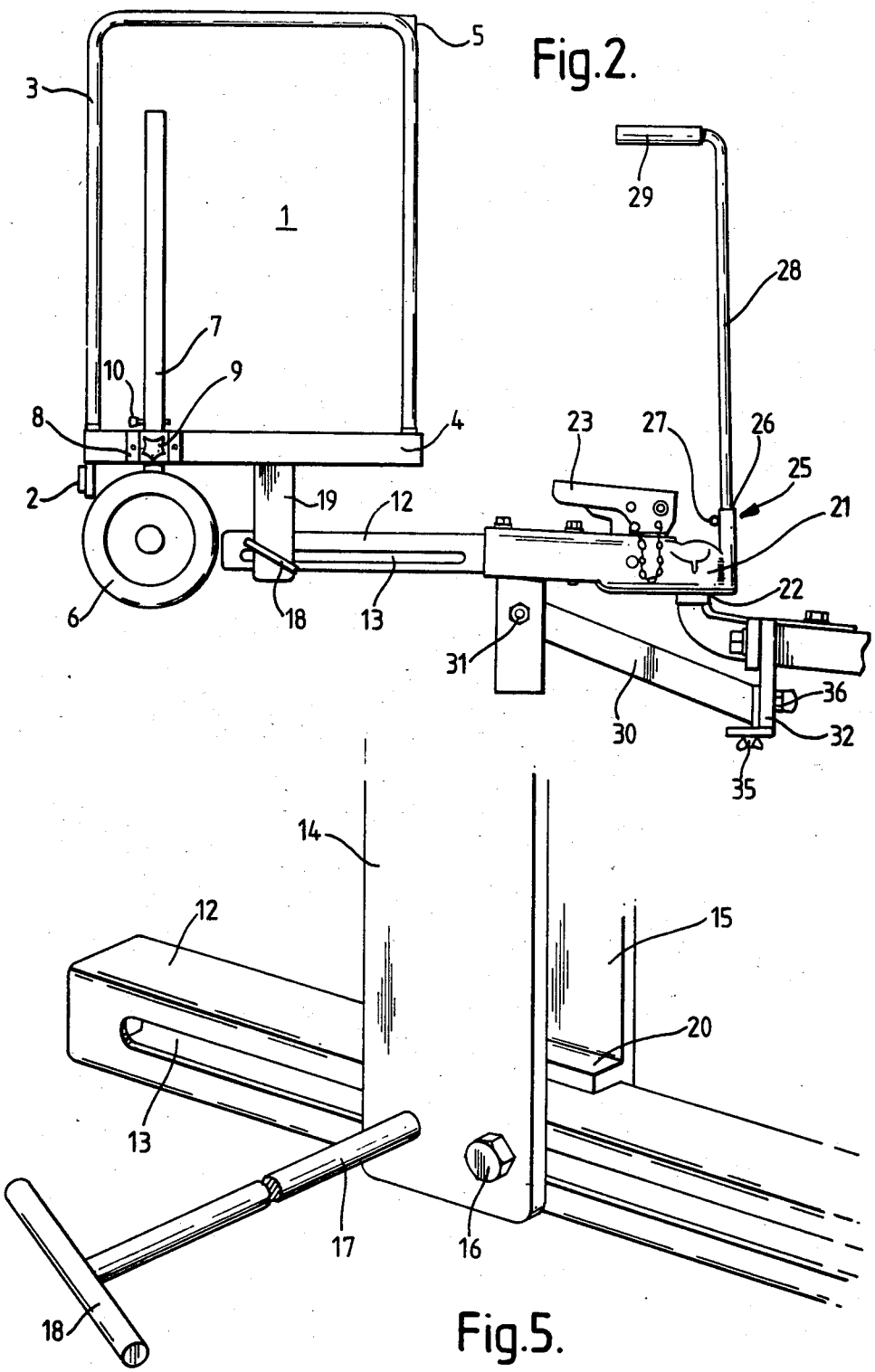

LOAD CARRYING UNIT

FIELD OF THE INVENTION

The present invention relates to a load carrying unit for attachment to a vehicle. More particularly it relates to a load carrying unit which may be attached to the rear of a vehicle and which does not contact the ground.

It is known to provide trailers which may be towed by vehicles to increase their load carrying ability. However, such trailers have disadvantages in that sudden braking of the vehicle may cause the trailer to jackknife; the trailer may sway alarmingly when towed at any speed; and in any event, the use of a trailer may only be permissible when certain speed limits are adhered to.

SUMMARY OF THE INVENTION

It is an object of the present invention to overcome the disadvantages set out above by providing a load carrying unit which, in use, does not contact the ground.

According to the present invention, there is provided a load carrying unit for attachment to a vehicle comprising a load carrying portion, retractable wheel means connectable thereto and fixing means also connectable to said portion and adapted to co-operate with the vehicle, said fixing means including means for releasably fastening the unit to the vehicle and support arm means acting between the unit and the vehicle to hold the unit clear of the ground when said wheel means is retracted.

Preferably said support arm means is pivotable between an in-use position where it contacts the vehicle below the fastening means, and another position, preferably where it is adapted to contact the ground to support, with said wheel means, the unit.

Advantageously, the fastening means comprises a socket to co-operate with a ball of the vehicle.

The wheel means may be two wheels each one mounted to a respective elongate leg depending from the unit. Each of the legs may be arranged to telescope into or adjacent to the unit and be held by locking means in fixed disposition relative thereto. The wheel means may be located at the corners of the unit remote from the fixing means.

When a unit of the above kind is attached, in use, to the vehicle and held clear of the ground, there is of course an appreciable cantilevered stress on the fixing means extending from the load carrying portion of the unit to the vehicle. It is another object of the invention to reduce this cantilevered stress, preferably by shortening the distance between the unit load carrying portion and the point of attachment to the vehicle, once the unit is in position.

However, it is not at all apparent that means could or should be provided for reducing this distance, because it is essential to have means of access to the fixing means, whether it is a socket coupling or some other mechanism by which the unit is fixed to the vehicle, in order to be able to release the unit from the vehicle. According to a preferred embodiment of the present invention, the cantilevered stress on the relevant parts of the unit can be reduced, whilst at the same time retaining a means of access to the socket or other attachment mechanism, by providing means whereby said load carrying portion of the unit can slide towards and away from the vehicle once the unit is in position; and means to clamp said load carrying portion in one of a plurality of positions in relation to the vehicle.

Preferably said load carrying portion slides in or on an arm which does not itself vary in length. There may be two clamping positions, at the extreme points remote from and adjacent to the point of attachment of the unit to the vehicle.

Advantageously the load carrying portion slides in or on a single arm which projects from the vehicle, when the unit is in position, and which runs centrally of the unit. There need then be only a single clamping means to fasten and unfasten each time said loading carrying portion is moved.

The load carrying portion may alternatively move on an arm which telescopes. In practice this is difficult to achieve because of the proximity of the vehicle bodywork, and because the arm must satisfy certain load carrying requirements.

BRIEF DESCRIPTION OF THE DRAWINGS

In the accompanying drawings:

FIG. 1 is a perspective view from one side of the unit showing it in position just before being engaged to the vehicle;

FIG. 2 is a side elevation of the unit when it has just been engaged to the vehicle;

FIG. 3 shows the unit, engaged to the vehicle, being moved to the travel position;

FIG. 4 is a close-up perspective view of the wheel locking means;

FIG. 5 is a close-up view of the clamping means;

DESCRIPTION OF THE PREFERRED EMBODIMENT

Figure 6:
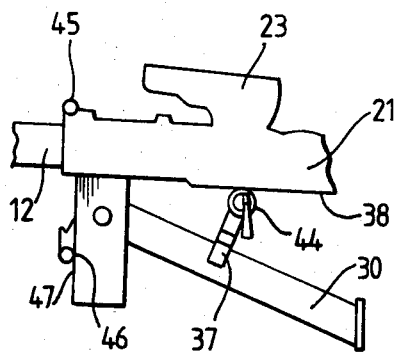
FIGS. 6 and 7 show the socket and support arm, fitted with a socket-raising cam mechanism, respectively in side elevation and end elevation.

Referring now the the drawings, there is shown a load carrying unit having a load carrying compartment 1. While this may be defined by four walls and a floor constructed from sheet metal or other suitable material, the preferred construction is shown in FIG. 2. Each side of the unit comprises a metal hoop 3 joined at its ends to the floor 4 of the unit. The two hoops 3 are connected together at one of their upper corners, advantageously that facing the vehicle, by a welded on angle section bracket 5. The assembly may be covered, in use, by a flexible cover made of plastics, tarpaulin, canvass or other suitable material. The cover is preferably shaped to be attached to the base along both sides and the edge facing the vehicle with the side remote from the vehicle being able to be rolled up to allow access to the load carrying space 1. This rolled up flap may be sealed to the remainder of the cover by velcro strips along the edges and by eyelets attaching it to the base 4. This will result in a waterproof cover with negligible weight. To the rear of the unit may be attached a bar provided with known lighting displays 2 which may be connected to the vehicle by an electric cable (not shown) and reflective triangles or other suitable warning devices (not shown).

A wheel 6 is journalled to a respective leg 7 adjacent each of the rear corners of the unit. Each leg 6 is so dimensioned that it will slide up inside a corresponding square cross-section clamping bracket 8 attached to the floor 4. Each leg 7 may be held in raised position by screwing into the leg through bracket 8 a finger indented threaded handle 9. As an added safety precaution a pin 10 may be inserted into a hole in the leg to hold it clear of the ground. A backbone 12 of square hollow box section extends centrally along the length of the load carrying portion. It is slotted as indicated at 13 along one of its sides.

Arms 14, 15 are welded to the underside of the load carrying portion 1 of the unit and project downwardly therefrom to embrace the backbone 12. A bolt 16 pierces one of the arms, 14, and enters the slot 13. It is held in slot 13 by a nut and washer (neither shown) which allow the bolt shank to ride in the slot but do not clamp the arm 14 to the backbone 12.

A clamping rod 17 also pierces the arm 14 alongside bolt 16. The rod 17 enters the slot 13 on the far side of which it engages a screw-threaded clamping nut (not shown) to give an easily fastened and unfastened friction clamp. The end of the rod 17 remote from the backbone 12 is provided with a handle 18 and supported by passing through another arm 19 welded to the edge of the floor 4. The other side of the backbone 12 may be similarly slotted, with two bolts such as bolt 16 piercing it alongside one another so that both arms 14, 15 run in parallel slots such as 13. Alternatively—or additionally—a rib 20 could project from the inner face of arm 15 and bear against the top surface of backbone 12.

The load carrying portion 1 of the unit may, by this means, be moved towards and away from the vehicle along the backbone 12. It may be clamped in any desired position simply by turning handle 18.

A socket 21 is bolted at the forward end of the backbone 12. It is adapted to co-operate with a ball 22 attached to the rear of the towing vehicle. To disconnect the ball and socket, a safety handle 23 is pulled up. As a safety precaution, a pin 24 may be inserted in a hole to prevent the handle being pulled up unintentionally. To connect the unit to the vehicle, the socket 21 is pushed on to the ball 22 and pushed downwardly to overcome spring loading.

Attached adjacent the socket 21 is a handle unit 25. This comprises a fixed portion 26 welded to the socket 21. Attached to the fixed portion 26 is a cross-bar handle 27 to enable lifting of the unit when the user is bent over the socket. Freely pivotable within the fixed portion 26 is an extension handle 28 enabling the unit to be moved around without the user bending over to use the crossbar handle 27. As stated, this is freely pivotable so that the bent over handle portion 29 can face in any convenient direction for use but can be pivoted to lie clear of any part of the vehicle when the unit is attached thereto.

A support arm 30 is pivoted about point 31 to the unit. In use, it co-operates with an L-shaped plate 32 attached below the ball 22 of the vehicle. Once in position, the support arm 30 acts as a cantilever to enable the wheels 6 of the unit to be retracted. Clearly, the more weight, within limits, that is placed in the unit, the more strongly will the support arm be forced into engagement with the L-shaped plate 32. As a safety precaution, a threaded bolt 33 extends from the base of the support arm and is adapted to pass into a slot 34 in the L-shaped plate 32. A butterfly nut 35 can be tightened on the threaded bolt 33. Once the arm is in position, the butterfly nut 35 is tightened whereby the arm 30 and plate 32 are joined. There are provided in the plate 32 a pair of adjusting nuts 36. These are spaced remote one from the other and one or the other can be screwed in to change the angle of the support arm 30 in the event that the unit is not straight. The support arm is T-shaped so that, by its lateral width, it prevents excessive swaying of the unit and can be contacted by the adjusting nuts 36. However, it would be possible to achieve the same effect by providing two support arms contacting the vehicle at spaced points and possibly arranged generally as a triangle. It would of course be possible, in an alternative embodiment, to arrange the support arm to be attached to the vehicle above the socket and, instead of acting as a cantilever, it would be hooked over a projection of the vehicle. The support arm 30, when not in use, pivots about point 31 and acts as a stand for the unit.

To attach the unit to a vehicle, it is wheeled to the rear of the vehicle being held by handle 29 or cross-bar handle 27. The support arm 30 is engaged with plate 32 followed by dropping the socket 21 on to the ball 22. Once this has clicked home, the butterfly nut 35 is tightened, and if necessary, one or other of the adjusting nuts 36 is turned to ensure correct alignment of the unit. The legs 7 are retracted to raise the wheels 6 off the ground, and the legs are held in position by tightening clamps 9 and inserting pins 10. Handle 18 is then turned to unclamp arm 14 from the backbone 12 and allow the load carrying portion 1 to be moved forwardly. This is shown in Figure 3. When the unit is in the most forward position, the handle 18 is tightened again to lock arm 14 with respect to backbone 12 and hold the load carrying portion 1 in position. This final manoeuvre reduces the cantilever stress on arm 30 and enables more weight to be carried at less risk either of breakage of the link or of the wheels 6 touching the ground at the base of inclines. The unit is then ready for use. It has been shown that a unit of this type can carry safely a load of 150 lbs and can safely travel at speeds of over 70 miles per hour.

When the unit is not being used. It can be stood on its two wheels 6 and the support arm 30. Since each wheel 6 and associated leg 7 is controlled independently, the unit may be maintained horizontal even where the ground slopes or is uneven. In this condition the floor 4 may be used as a table or the like.

The unit is particularly useful for campers who may store their tents and camping equipment in it. They may drive to a camp site, unhitch the unit and wheel it to a desired location. However, the unit may also be used by travelling salesmen, yachtsmen and the like.

If so desired, there may be made provision for one or more extending handles to aid in movement of the unit when unhitched. Also, the wheels may be arranged differently. For example, if each wheel was turned or turnable through a right-angle, the unit could be wheeled sideways to the rear of the vehicle. The wheels could be located in corners of the unit, either those remote from or those adjacent the fixing means. However, it is preferred for them to be at or near the rear where they serve a useful purpose. When being driven over very rough ground, with the chance of the unit hitting the ground, the position of the wheels ensures that, should this happen, it is the wheels which hit the ground and turn.

In the embodiment illustrated in FIGS. 1 to 5, the unit is defined by hoops 3 and a flexible cover. However, a rigid top may be provided. It is preferably of lightweight construction, e.g. plywood, or more particularly, glassfibre reinforced, or other, plastics material.

Figure 7:
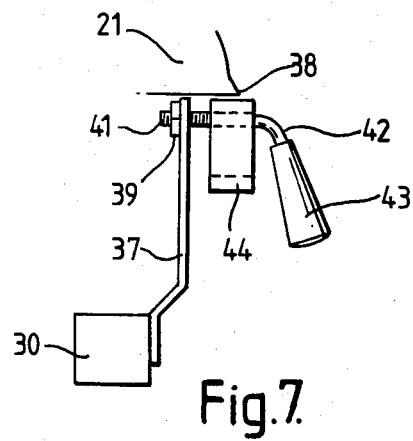

An improved embodiment is shown in FIGS. 6 and 7. The support arm 30 has an arm 37 welded to it. The arm 37 projects upwardly at right-angles from the support arm 30, and (as FIG. 7 shows) is cranked outwardly to end adjacent the undersurface of the rim 38 of the socket 21. The arm 37 is a rigid steel arm.

Welded to the back side of the arm 37 adjacent the projecting end thereof is a screw-threaded nut 39. The arm 37 is drilled to allow a co-operating screw-threaded shaft 41 to pass through the arm and engage the nut 39. The shaft 41 is cranked and extended to form a hand lever 42 which, in the embodiment illustrated, is covered by a plastics handle 43.

A circular steel ring 44 is welded to the shaft 41. When shaft 41 rotates by screw-threaded interaction between its end and the nut 39, ring 44 moves with it and rotates eccentrically about the axis of shaft 41. It thereby forms a cam mechanism operative on undersurface 38.

Rotation of shaft 41 about its axis causes it to travel axially towards or away from arm 37. Ring 44 therefore travels axially as well as rotating eccentrically.

When the cam mechanism is inoperative, shaft 41 is unscrewed sufficiently far to move ring 44 away out of contact with the underside of rim 38 of the socket 21. To operate the cam mechanism, with the vehicle at rest and the unit's wheels supporting it on the ground, the locking handle 23 of socket 21 is released and shaft 41 is rotated clockwise to carry ring 44 towards undersurface 38. The arrangement is such that ring 44 will first move in underneath surface 38 and then, on the next revolution, will bear against surface 38 to raise socket 21 from the towing ball (not shown).

As illustrated, shaft 41 is freely rotatable in nut 39, and so gravity normally causes ring 44 to hang in the illustrated position. Even if shaft 41 is not retracted again before socket 21 is subsequently coupled and locked to the towing ball, ring 44 will not obstruct such attachment of the socket to the ball but will simply bear against undersurface 38 until the cam mechanism is next operated.

The initial raising of the socket from the ball, using the cam lever, makes it easier for an inform or disabled person to lift the socket the rest of the way off the ball; and hence free the unit from the vehicle. It is well-known that conventional sockets have initially to be pulled fairly hard vertically in order to release them from their towing ball even after they have been unclamped, and the cam mechanism eases this problem greatly.

Clearly the cam is intended to be used in the manner described only when the vehicle is at a standstill and the retractable wheel means of the unit have been lowered to the ground to support the unit as the unit is released from the vehicle.

Figure 8:
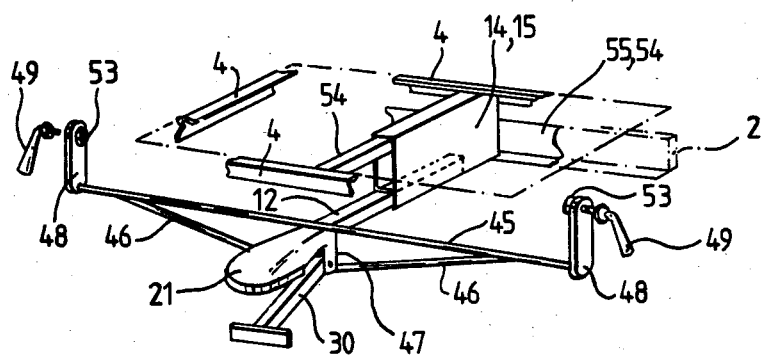
FIGS. 8 and 9 show in perspective the unit fitted with a bracing frame and twin spaced-apart clamping means.
Figure 9:
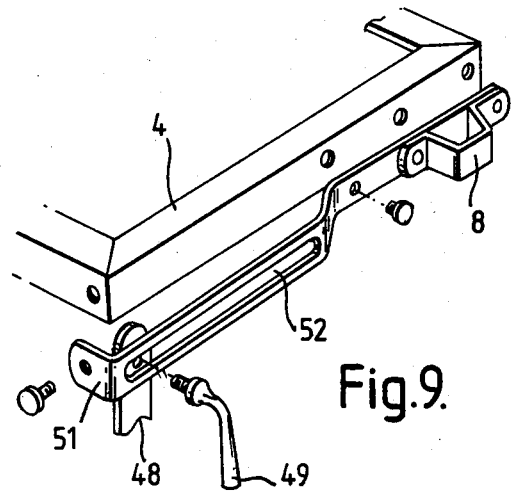

An alternative embodiment of the clamping mechanism is shown in FIGS. 8 and 9. A straight steel strut 45 is welded across the top surface of the central support arm 12 of the unit. Another single V-shaped steel strut 46 is welded to the back of the base 47 of support arm 30. Each opposite end of strut 46 is welded to strut 45 to form a rigid bracing framework transverse to the central arm 12. In the particular embodiment illustrated, struts 45 and 46 are both hollow circular section tubes.

Arms 48 project rigidly upward from each opposite end of strut 45. The projecting end of each arm has a clearance hole drilled through it. Cranked levers 49 with screwthreaded inner ends pass through these holes to function as clamps in a way which will become apparent as the description proceeds.

Steel strips 51 are secured one to each opposite longitudinal side of the basic unit framework 4 and, as FIG. 9 shows, are cranked outwardly from that framework. Each such strip 51 is slotted along its length. The screw-threaded inner end portions of levers 49 pass through the slots 52, and the holes drilled in the projecting ends of arm 48, to engage respective co-operating screw-threaded nuts 53 welded one to each inner face of arms 48.

The basic unit framework 4 is supported on a box 14, 15 which, as FIG. 8 shows, can slide along central supporting arm 12. Box 14, 15 has its own central arm 54 welded rigidly to it, and the opposite ends of this arm 54 are themselves welded to respective cross pieces of the basic unit frame 4.

It will be apparent that levers 49 function as screw clamps, one on either side of the unit, to regulate the position of the load carrying portion 4 on the basic unit framework. Essentially they trap strips 51 against arms 48 when rotated clockwise, and release the strips when rotated anti-clockwise. A plate 55, welded to the back of box 14, 15 carries the lighting units 2 of the apparatus and moves back and forth with box 14, 15.

This alternative embodiment again makes it easier for infirm or disabled people to release the clamping means. Although there are two separate clamping means to be released, they are each far more accessible than a single central clamping means. In addition, the use of a frame spanning the slide-arm braces the whole structure considerably. When the load carrying portion is clamped in place, there is less tendency for the loaded unit to "yaw" than there would be without the bracing frame and twin spaced-apart clamping positions.

The unit has added advantages over known trailers in that there is no difficulty in reversing, as there may be with trailers, and also, since the wheels do not contact the ground, there is no need to provide braking means for them.

In another alternative embodiment, the wheels 6 could be replaced by skids. This would enable the unit to be used more easily in snow and icy conditions. It is thus to be understood that skids and the like fall within the scope of wheel means.

I claim:

1. A load carrying unit for attachment to a vehicle having a ball member of a ball joint mounted thereon, the unit comprising:
   a load carrying portion;
   wheel means;
   wheel mounting means retractably mounting said wheel means with respect to said load carrying portion;
   fixing means comprising fastening means including a socket cooperable with the ball member to releasably fasten said load carrying portion to the vehicle;
   means coupling said fixing means to said load carrying portion;
   support arm means;
   means coupling said support arm means to said load carrying portion; and
   means releasably coupling said support arm means to the vehicle, whereby to hold the load carrying portion clear of the ground, when said wheel mounting means have retracted said wheel means.

2. The load carrying unit of claim 1, further comprising means slidably mounting said load carrying portion with respect to said fastening means, whereby the load carrying position may be slid along a notional axis extending along a longitudinal axis of the vehicle towards and away from the vehicle; and clamping means whereby to clamp said load carrying portion in any one of a plurality of positions relative to the vehicle.

3. The load carrying unit of claim 1 wherein said wheel means comprises a first and a second wheel; and said wheel mounting means comprises a first and a second elongate leg, and further comprising means mounting said first and second wheel on the first and second elongate leg respectively, means slidably mounting each elongate leg with respect to the load carrying portion whereby to depend from the load carrying portion and locking means for locking said elongate legs in position.

4. The load carrying unit of claim 2, further comprising a frame extending transverse to said axis of the means slidably mounting said load carrying portion and having a first and a second opposite end; and means rigidly fixing said frame to said fixing means; and wherein said clamping means comprises first and second clamping means;

means mounting said first clamping means at said first end of the frame, and means mounting said second clamp means at said second end of the frame whereby to locate each clamping means in readily accessible positions.

5. A load carrying unit for attachment to a vehicle, the unit comprising:

a load carrying portion;

wheel means;

wheel mounting means retractably mounting said wheel means with respect to said load carrying portion;

fixing means comprising fastening means to releasably fasten said load carrying portion to the vehicle;

means slidably mounting said load carrying portion with respect to said fastening means comprising an arm of fixed length having a first end means connecting said first end of said arm to said fixing means;

a slide slidable along said arm, and means connecting said slide to said load carrying portion, whereby the load carrying position may be slid along a notional axis extending along a longitudinal axis of the vehicle towards and away from the vehicle; and clamping means whereby to clamp said load carrying portion in any one of a plurality of positions relative to the vehicle;

means coupling said fixing means to said load carrying portion;

support arm means;

means coupling said support arm means to said load carrying portion; and means releasably coupling said support arm means to the vehicle, whereby to hold the load carrying portion clear of the ground, when said wheel mounting means have retracted said wheel means.

6. A load carrying unit for attachment to a vehicle the unit comprising:

a load carrying portion;

wheel means;

wheel mounting means retractably mounting said wheel means with respect to said load carrying portion;

fixing means comprising fastening means to releasably fasten said load carrying portion of the vehicle;

means slidably mounting said load carrying portion with respect to said fastening means comprising a telescopic arm having a first end and a second opposite end, means connecting said first end to said fixing means, and means mounting said load carrying portion on said second end, clamping means whereby to clamp said load carrying portion in any one of a plurality of positions relative to the vehicle, means coupling said fixing means to said load carrying portion;

support arm means;

means coupling said support arm means to said load carrying portion; and means releasably coupling said support arm means to the vehicle, whereby to hold the load carrying portion clear of the ground, when said wheel mounting means have retracted said wheel means.

7. A load carrying unit for attachment to a vehicle, the unit comprising:

a load carrying portion;

wheel means;

wheel mounting means retractably mounting said wheel means with respect to said load carrying portion;

fixing means comprising fastening means to releasably fasten said load carrying portion to the vehicle;

means coupling said fixing means to said load carrying portion;

support arm means;

means coupling said support arm means to said load carrying portion; and means releasably coupling said support arm means to the vehicle, whereby to hold the load carrying portion clear of the ground, when said wheel mounting means have retracted said wheel means, means pivotally mounting said support arm means with respect to said load carrying portion, whereby to pivot said support arm means between an in-use position where it contacts the vehicle below the fastening means, and a rest position where it is adapted to contact the ground to supprt, with said wheel means, the unit.

8. A load carrying unit for attachment to a vehicle, the unit comprising:

a load carrying portion;

wheel means;

wheel mounting means retractably mounting said wheel means with respect to said load carrying portion;

fixing means comprising fastening means to releasably fasten said load carrying portion to the vehicle;

means coupling said fixing means to said load carrying portion;

support arm means;

means coupling said support arm means to said load carrying portion; and means releasably coupling said support arm means to the vehicle, whereby to hold the load carrying portion clear of the ground, when said wheel mounting means have retracted said wheel means, a cam and means rotatably mounting the same on the support arm means, whereby when the fastening means is fastened to the vehicle and when the means releasable coupling said support arm means to the vehicle is coupled to the vehicle, the cam is positioned immediately below the fastening means, the fastening means including an undersurface and the cam having a shape and size such that a user may rotate the cam by hand so that it contacts the undersurface of the fastening means whereby to release the releasable fastening means to release the load carrying portion from the vehicle.

* * * * *